(12) United States Patent
Park et al.

(10) Patent No.: US 9,170,645 B2
(45) Date of Patent: Oct. 27, 2015

(54) METHOD AND APPARATUS FOR PROCESSING INPUT IN MOBILE TERMINAL

(75) Inventors: Hyung-Kil Park, Gyeonggi-do (KR);
Min-Hwan Seo, Gyeonggi-do (KR)

(73) Assignee: Samsung Electronics Co., Ltd.,
Suwon-si, Gyeonggi-do (KR)

( * ) Notice: Subject to any disclaimer, the term of this patent is extended or adjusted under 35 U.S.C. 154(b) by 151 days.

(21) Appl. No.: 13/422,157

(22) Filed: Mar. 16, 2012

(65) Prior Publication Data

US 2012/0293406 A1    Nov. 22, 2012

(30) Foreign Application Priority Data

May 16, 2011 (KR) .................. 10-2011-0045587

(51) Int. Cl.
*G09G 5/00* (2006.01)
*G06F 3/01* (2006.01)
*G06F 1/16* (2006.01)
*G06F 3/0485* (2013.01)
*G06F 3/0484* (2013.01)

(52) U.S. Cl.
CPC .............. *G06F 3/013* (2013.01); *G06F 1/1626* (2013.01); *G06F 1/1686* (2013.01); *G06F 3/0485* (2013.01); *G06F 3/04842* (2013.01); *G06F 2203/0381* (2013.01); *G06F 2203/04806* (2013.01)

(58) Field of Classification Search
CPC ... G06F 3/013; G06F 3/0485; G06F 3/04842; G06F 1/686; G06F 1/1626; G06F 2203/04806; G06F 2203/0381
USPC .................................................. 345/156–178
See application file for complete search history.

(56) References Cited

U.S. PATENT DOCUMENTS

| | | | |
|---|---|---|---|
| 5,689,619 A | 11/1997 | Smyth | |
| 5,850,211 A * | 12/1998 | Tognazzini | 345/158 |
| 7,773,828 B2 * | 8/2010 | Sakata et al. | 382/294 |
| 2007/0188473 A1 * | 8/2007 | Anwar | 345/173 |
| 2008/0143674 A1 * | 6/2008 | Molander et al. | 345/157 |
| 2010/0182232 A1 * | 7/2010 | Zamoyski | 345/157 |
| 2010/0231504 A1 * | 9/2010 | Bloem et al. | 345/156 |
| 2010/0321324 A1 * | 12/2010 | Fukai et al. | 345/173 |
| 2011/0019874 A1 * | 1/2011 | Jarvenpaa et al. | 382/103 |

FOREIGN PATENT DOCUMENTS

KR    10-2006-0027717 A    3/2006
WO    2010/118292 A1    10/2010

* cited by examiner

*Primary Examiner* — Andrew Sasinowski
(74) *Attorney, Agent, or Firm* — Cha & Reiter, LLC

(57) ABSTRACT

A method for processing an input in a mobile terminal that recognizes inputs such as a visual input and/or voice input is provided. In the method, a position on a screen corresponding to a viewing direction of a user's eyes is determined. An indicator corresponding to the determined position is displayed on the screen. When a relevant (i.e. actuating) signal is detected, an indicator is arranged on the desired object for selection.

15 Claims, 15 Drawing Sheets

METHOD AND APPARATUS FOR PROCESSING INPUT IN MOBILE TERMINAL

This application claims the benefit of priority under 35 U.S.C. §119(a) of a Korean patent application filed in the Korean Intellectual Property Office on May 16, 2011 and assigned Serial No. 10-2011-0045587, the entire disclosure of which is hereby incorporated by reference in its entirety.

BACKGROUND OF THE INVENTION

1. Field of the Invention

The present invention relates to a mobile terminal. More particularly, the present invention relates to an apparatus and a method for processing an input, on an input area of a mobile.

2. Description of the Related Art

Currently, as the electronic communication industry continues to develop, a mobile terminal, which includes devices including but not limited to a mobile communication terminal (cellular phone), an electronic scheduler, a personal digital assistant, etc. has become a necessity of a modern society, and serves as an important means for transferring information quickly.

Generally, a conventional mobile terminal includes at least one button for performing an input. This button may be realized mechanically as a keybutton, for example, or when a touch screen is used, it may be realized in a in conjunction with software. When a user presses the button with his finger, an input signal (i.e. an actuating signal) for a relevant operation occurs. However, the conventional button may be useless to a user with a disability that involves manipulating his/her hands or fingers. In having difficulty in manipulating his/her hands, or a user facing a circumstance where the user cannot use his hands. Therefore, there is a need in the art for an improved input method that solves this inconvenience.

SUMMARY OF THE INVENTION

An exemplary aspect of the present invention is to provide an apparatus and a method for processing an input by an input unit of a mobile terminal, that advantageously can generate an input without using hands in a mobile terminal Another exemplary aspect of the present invention is to provide an apparatus and a method for processing an input by an input unit of a mobile terminal, that uses at least one of tracking a user's eyes or voice detection, or a combination in order to generate an input in a mobile terminal.

Still another exemplary aspect of the present invention is to provide an apparatus and a method for processing an input by an input unit of a mobile terminal, that generates various inputs depending on an amount of eye flickering and a kind thereof in a mobile terminal.

Yet another exemplary aspect of the present invention is to provide an apparatus and a method for processing an input by an input unit of a mobile terminal, that generates an input for selecting a relevant object, rearranging an object, and performing a screen scroll by tracking eye movement and/or voice detection.

Other exemplary aspects, advantages and salient features of the invention will become more apparent to those skilled in the art from the following detailed description, which, taken in conjunction with the annexed drawings, discloses exemplary embodiments of the invention.

In accordance another exemplary aspect of the present invention, a method for processing an input in a mobile terminal is provided. The method preferably comprises determining by controller a position on a screen sensed by a sensor that corresponds to a user's eyes and displaying an indicator corresponding to the determined position on the screen, and when a relevant signal is detected, selecting an object on the indicator.

In accordance with another exemplary aspect of the present invention, a method for processing an input in a mobile terminal is provided. The method preferably comprises dividing a display screen into one or more regions to which a relevant function has been designated, determining a position on the screen corresponding to a user's eyes and displaying an indicator corresponding to the determined position on the screen; and determining a region of the one or more regions to which the indicator belongs, and performing the relevant function.

In accordance with another exemplary embodiment of the present invention, an apparatus for processing an input in a mobile terminal is provided.

The apparatus preferably comprises an output unit for outputting voice data and display data, a storage for storing a predetermined program for controlling an overall operation and storing various data input/output while a control operation is performed, and a controller for receiving information from a camera or sensor regarding a user's eye movement, detecting a voice command provided from a microphone, and performing a control of an overall operation, wherein the controller determines a position on a screen corresponding to the user's eyes, displays an indicator corresponding to the determined position on the screen, and when a relevant signal is detected, selects an object put on the indicator.

In accordance yet another exemplary aspect of the present invention, an apparatus for processing an input in a mobile terminal is provided. The apparatus preferably comprises an output unit that outputs voice data and display data, a non-transitory storage for storing a predetermined program for controlling an overall operation and storing various data input/output while a control operation is performed, and a controller for receiving information from a camera or sensor regarding a user's eye movement, detecting a voice command provided from a microphone, and performing a control of an overall operation, wherein the controller determines a position on a screen corresponding to the user's eyes, displays an indicator corresponding to the determined position on the screen, and when a first signal is detected, selects an object put on the indicator as an object to be rearranged, when a second signal is detected, moves and displays the selected object along the user's eyes, and when a third signal is detected, arranges and displays the selected object on a relevant position.

BRIEF DESCRIPTION OF THE DRAWINGS

The above and other exemplary aspects, features and advantages of certain exemplary embodiments of the present invention will become more apparent to a person of ordinary skill in the art from the following description taken in conjunction with the accompanying drawings in which.

Throughout the drawings, like reference numerals will be understood to refer to like parts, components and structures.

DETAILED DESCRIPTION

The following description with reference to the accompanying drawings is provided to assist a person of ordinary skill in the art with in a comprehensive understanding of exemplary embodiments of the invention "Method and apparatus for Processing Input In Mobile Terminal" as defined by the appended claims and their equivalents. The specification includes various details to assist the person of ordinary skill in that understanding but these details are to be regarded as merely exemplary. Accordingly, those of ordinary skill in the art will recognize that various changes and modifications of the exemplary embodiments described herein can be made without departing from the scope and spirit of the claimed invention. Also, descriptions of well-known functions and constructions may be omitted for clarity and conciseness when their inclusion could obstruct appreciation of the claimed invention by a person of ordinary skill.

The terms and words used in the following description and claims are not limited to the bibliographical meanings, but, are merely used by the inventor to enable a clear and consistent understanding of the invention. Accordingly, a person of ordinary skill in the art should find it apparent that the following description of exemplary embodiments of the present invention are provided for illustration purposes only and not for the purpose of limiting the invention as defined by the appended claims and their equivalents.

Exemplary embodiments of the present invention discussed herein provide examples utilizing a mobile terminal. More particularly, exemplary embodiments of the present invention provide an apparatus and a method for processing an input, that generate an input without a finger's button pressing. An exemplary embodiment of the present invention provides an apparatus and a method for processing an input, that uses at least one of tracking a user's eyes and voice detection, or combines them to generate an input in a mobile terminal An exemplary embodiment of the present invention provides an apparatus and a method for processing an inputs that generate various inputs depending on eye flickering and a kind thereof in a mobile terminal. An exemplary embodiment of the present invention provides an apparatus and a method for processing an input, that generate an input for selecting a relevant icon, rearranging an icon, and performing screen scroll using eyes tracking or voice detection.

Figure 1:
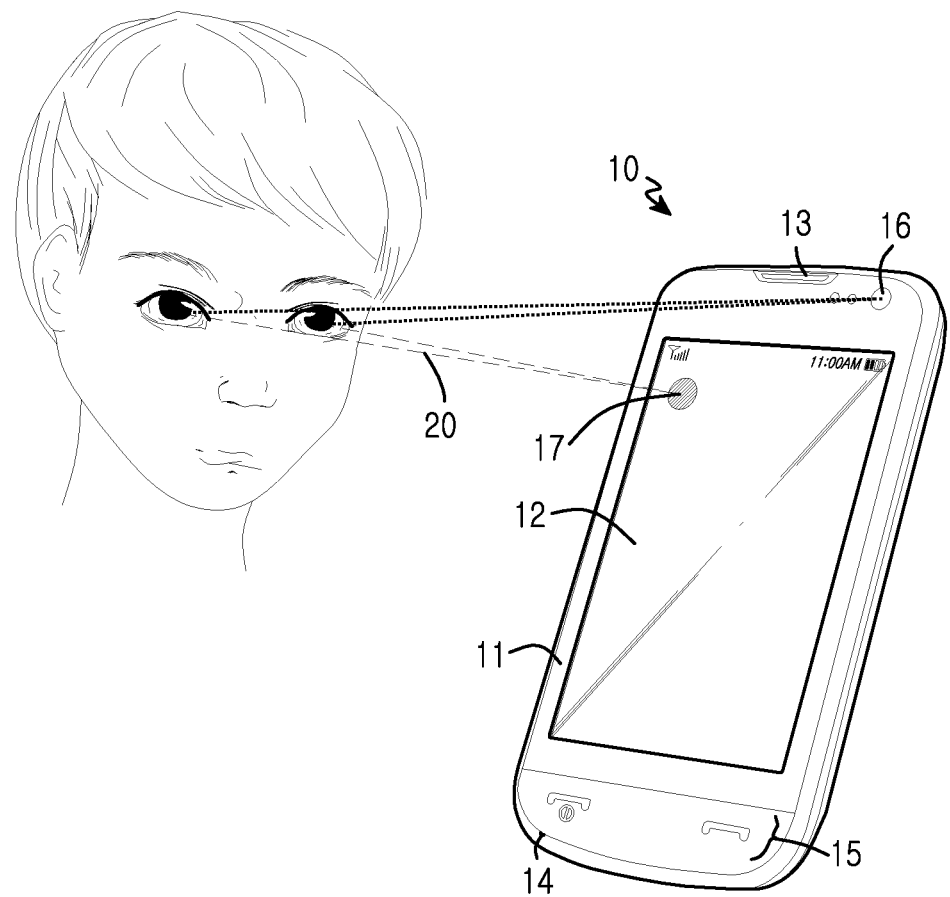
FIG. 1 is a view illustrating performing an input using a mobile terminal according to an exemplary embodiment of the present invention.

FIG. 1 is a view illustrating performing an input using a mobile terminal according to an exemplary embodiment of the present invention.

Referring now to FIG. 1, the mobile terminal 10 according to this exemplary embodiment of the present invention preferably includes a case frame 11, and the following elements inserted into the case frame 11. The mobile terminal 10 includes a known display 12, a speaker 13, a microphone 14, a key button 15, and a camera 16. A touch panel may be added to the display 12, so that a touch screen may be formed. More particularly, the mobile terminal 10 according to an exemplary embodiment of the present invention captures a user's eyeball movement captured by the camera 16 to track the user's eyes 20 viewing the screen and displays the same on the screen. For example, an indicator 17 is displayed on a position of the screen viewed by the user. The indicator displayed on the screen moves along movement of the user's eyes 20 viewing the screen as tracked by the camera. In addition, the mobile terminal 10 may detect and distinguish different kinds of a user's eye flickering captured by the camera 16 to generate a relevant input. Furthermore, the mobile terminal 10 may detect a user's voice input from the microphone 14 to generate an input. As described above, the mobile terminal 10 may perform functions such as an object (for example, an icon) selection, an object movement, a screen magnify/reduce, screen scroll, etc. using at least one of the indicator 17, eye flickering, and voice detection.

Figure 2:
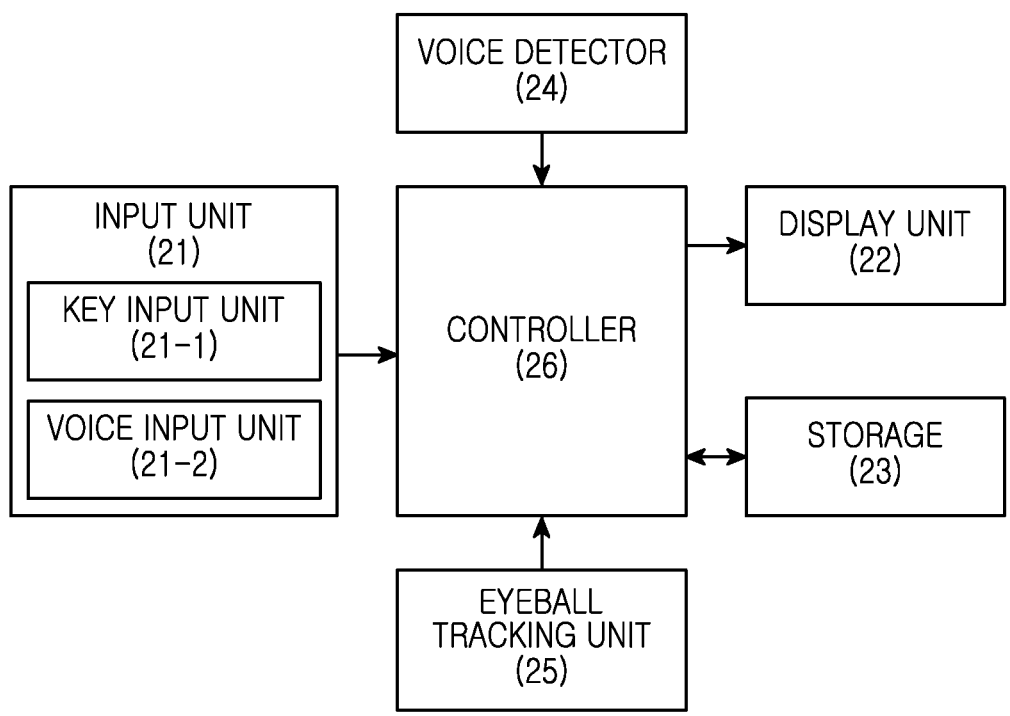
FIG. 2 is a block diagram illustrating a mobile terminal according to an exemplary embodiment of the present invention.

FIG. 2 is a block diagram illustrating a mobile terminal according to an exemplary embodiment of the present invention.

Referring now to FIG. 2, the mobile terminal 10 preferably includes an input unit 21 for generating an input signal, a display unit 22 for displaying display data, a storage 23 for storing data, a voice detector 24 for detecting voice, an eyeball tracking unit 25 for providing information regarding a user's eye movement, and a controller 26 for performing a control of an overall operation. The mobile terminal may further include a voice output unit for outputting voice data. The voice output unit and the display unit 22 may be bound and collectively called an output unit.

The input unit 21 outputs an input signal for a relevant operation to the controller 26. The input signal may be classified into a key signal corresponding to button pressing and a voice signal corresponding to voice. One could, for example, look at an image of a keyboard, and use eye movements to type, or could say the letter, number, symbol, or function aloud which will be received by the voice input of the input unit. Additionally, one may touch the image of the keys in the input unit, as there are times when using the keys manually are preferable over voice or eye movement.

The controller 26, which comprises a processor or microprocessor, performs a relevant function according to the input signal with reference to data stored in the storage 23. The storage 23 stores a predetermined program for controlling an overall operation and various data input/output while a control operation is performed. The voice detector 24 captures a voice detect signal designated to perform a relevant operation from voice signals provided from the input unit 21, and informs the controller 26 of this. The eyeball tracking unit 25 informs the controller 26 of an eyeball track signal regarding eyeball movement, eye flickering, etc. using the output from camera 16. The camera may comprise, for example, a CCD, The controller 26 performs a function according to a relevant voice detect signal provided from the voice detector 24. Furthermore, the controller 26 performs a function corresponding to an eyeball track signal provided from the eyeball tracking unit 25. The voice detector 24 and the eyeball tracking unit 25 may be included in the controller 26. A method for processing an input according to an exemplary embodiment of the present invention is described in detail with reference to the accompanying drawings.

In addition, the method described hereunder of the present invention may be provided as one or more instructions in one or more software modules stored in the storage device. The software modules may be executed by the controller.

The storage 23 may comprise a ROM, a RAM and a flash ROM. The ROM may store the micro-cord of a program for processing and controlling the controller 26 and the eyeball tracking unit 25, and various reference data.

The method executed by the eyeball tracking unit 25 may be provided as one or more instructions in one or more software modules stored in the storage 23. In that case, the software modules may be executed by the controller 26.

Figure 3A:
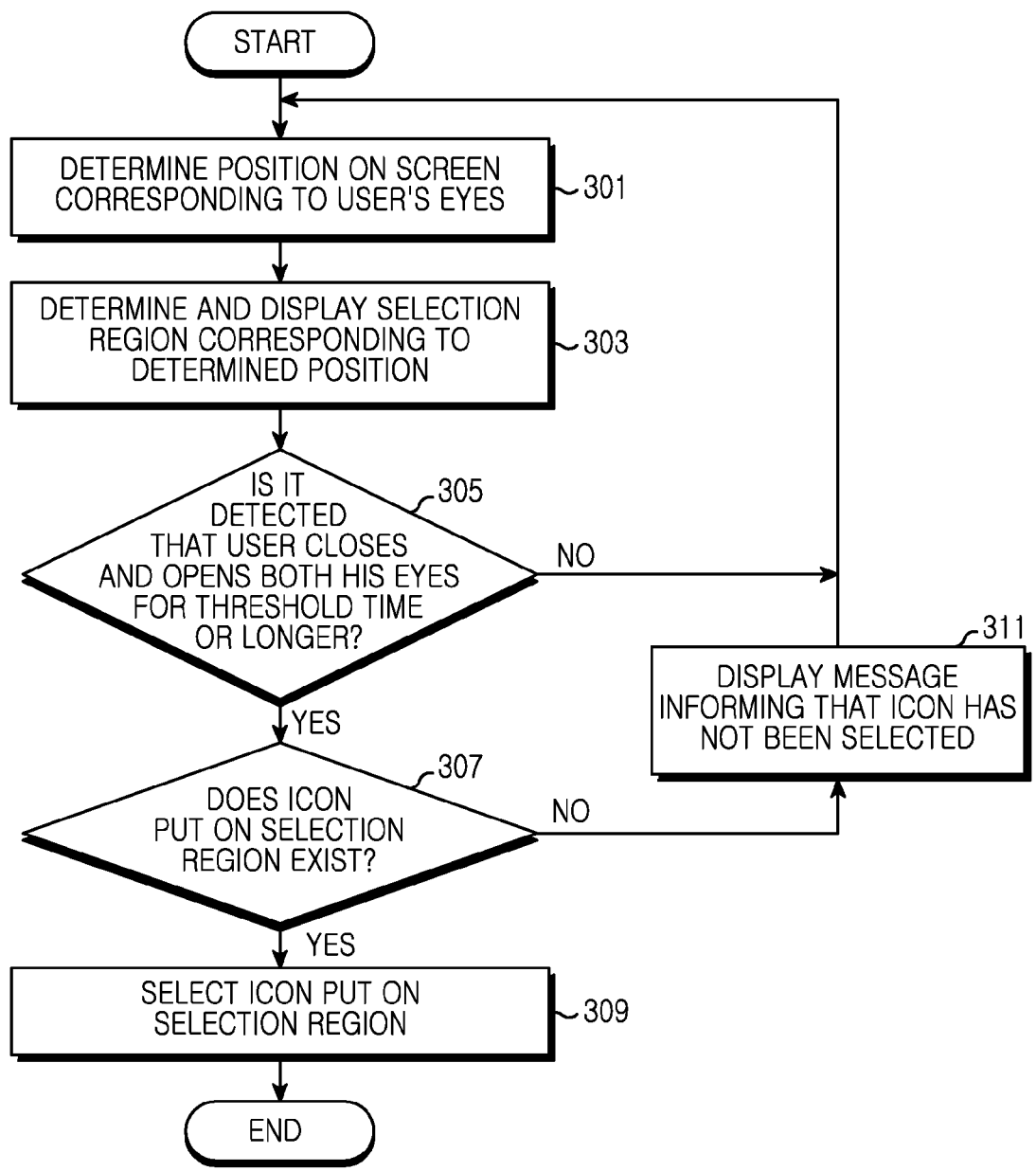
FIG. 3A is a flowchart illustrating a procedure for selecting an icon on an icon menu screen according to an exemplary embodiment of the present invention.

FIG. 3A is a flowchart illustrating an exemplary procedure for selecting an icon on an icon menu screen according to an exemplary embodiment of the present invention. Though an icon is taken as an example of a selected object, the object to be selected according to the presently claimed invention is not limited thereto.

Referring now to FIG. 3A, the controller 26 determines a position on a screen corresponding to a user's eyes on an icon menu screen (step 301). The tracking can, for example, track the position of the pupil relative to the position of the screen.

The controller 26 displays an indicator for the determined position on the screen (step 303). In other words, the indicator may be displayed on the position of the screen viewed by the user. According to an exemplary embodiment of the present invention, the indicator may be displayed in a circular selection region. Since the position on the screen corresponding to the user's eyes is not fixed, the controller 26 may determine and display the circular selection region in various methods. For one possible example, the controller 26 may determine positions on 20 the screen corresponding to the user's eyes for a predetermined time or periodically, and then determine the circular selection region using an average and a standard deviation. Visual tracking software can be used to identify and track the eye movement.

The controller 26 determines whether both eyes are closed and opened for a predetermined threshold time or longer is detected (step 305). When both eyes are closed and opened for a threshold time or longer is not detected, the controller 26 performs processes subsequent to step 301. In contrast, when both eyes are closed and opened for a threshold time or longer is detected, the controller 26 determines whether an icon put on the selection region exists (step 307). When an icon put on the selection region exists in step 307, the controller 26 selects an icon put on the selection region (step 309). The result is exactly the same as the case where a user touches a relevant icon with his finger to select the same in a general touch screen terminal When an icon put on the selection region does not exist in step 307, the controller 26 displays a message informing that an icon has not been selected (step 311), and performs processes subsequent to step 301. The message may be displayed using characters or voice.

Figure 3B:
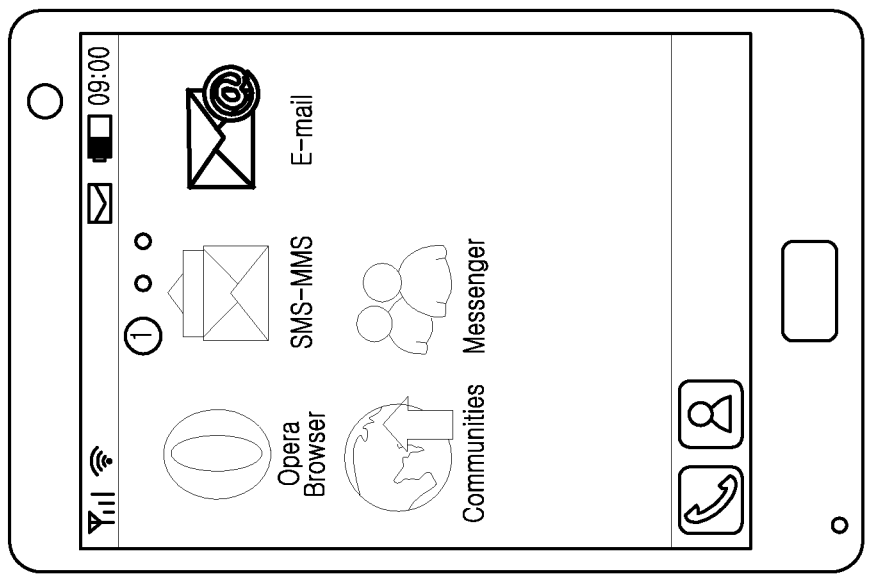
FIG. 3B is a view illustrating exemplary operation of a process for selecting an icon on an icon menu screen according to an exemplary embodiment of the present invention.
Figure 3B:
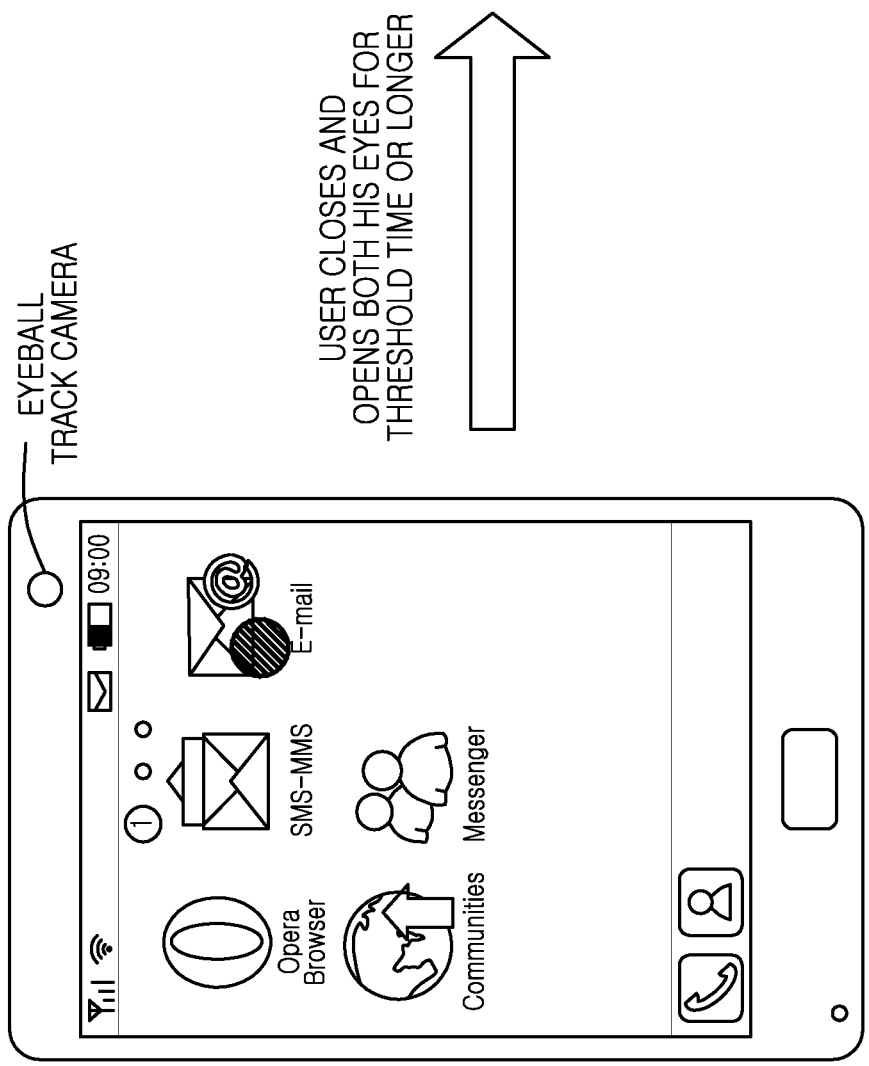

FIG. 3B is a view illustrating a process for selecting an icon on an icon menu screen according to an exemplary embodiment of the present invention.

Referring now to FIG. 3B, a position on an icon menu screen viewed by a user is displayed as a circular selection region (a). After that, when a user closes and opens both eyes, an icon put on the selection region is selected (b).

Figure 4A:
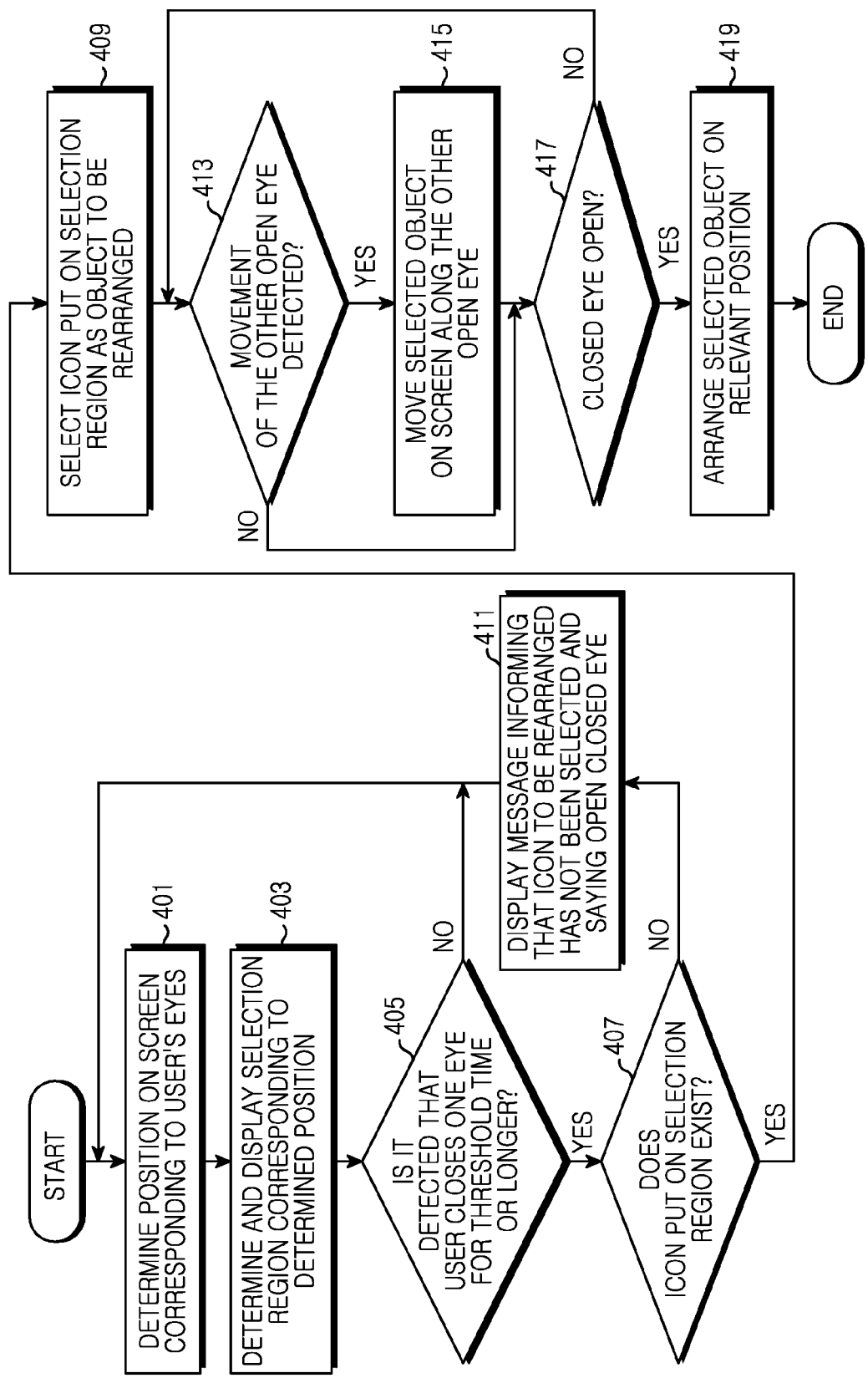
FIG. 4A is a flowchart illustrating an exemplary procedure for rearranging an icon on an icon menu screen according to an exemplary embodiment of the present invention.

FIG. 4A is a flowchart illustrating a procedure for rearranging an icon on an icon menu screen according to an exemplary embodiment of the present invention. Though an icon is taken as an example of an object to be rearranged, the object for selection is not limited thereto.

Referring now to FIG. 4A, the controller 26 determines a position on a screen corresponding to a user's eyes on the icon menu screen (step 401).

The controller 26 displays an indicator for the determined position on the screen (step 403). As described above, the indicator may be displayed as a circular selection region.

The controller 26 determines whether one eye is closed for a threshold time or longer is detected (step 405). When detecting that one eye is not closed for the threshold time or longer, the controller 26 performs processes subsequent to step 401. In contrast, when detecting that one eye is closed for the threshold time or longer, the controller 26 determines whether an icon put on the selection region exists (step 407). When an icon put on the selection region exists in step 407, the controller 26 selects the icon put on the selection region as an object to be rearranged (step 409). The controller 26 may allow the selected icon for being rearranged to be displayed in relief compared to other icons. When an icon put on the selection region does not exist in step 407, the controller 26 informs that an icon for being rearrangement has not been selected, displays a message saying to open the closed eye (step 411), and performs processes subsequent to step 401. The message may be displayed using characters or output using voice. This process permits inducing the selection region to be put on an icon that a user desires to rearrange.

The controller 26 determines whether the other open eye moves (step 413). When detecting that the other open eye moves, the controller 26 moves the selected icon to a position corresponding to the movement on the screen (step 415). However, when not detecting that the other open eye moves, the controller 26 re-performs processes subsequent to step 417. The controller 26 can ignore flickering of the other open eye in step 413.

The controller 26 then determines whether the closed eye is opened (step 417). When detecting that the closed eye is opened, the controller 26 arranges the selected icon to the position determined in step 413 (step 419). In contrast, when not detecting that the closed eye is opened, the controller 26 performs processes subsequent to step 413.

Figure 4B:
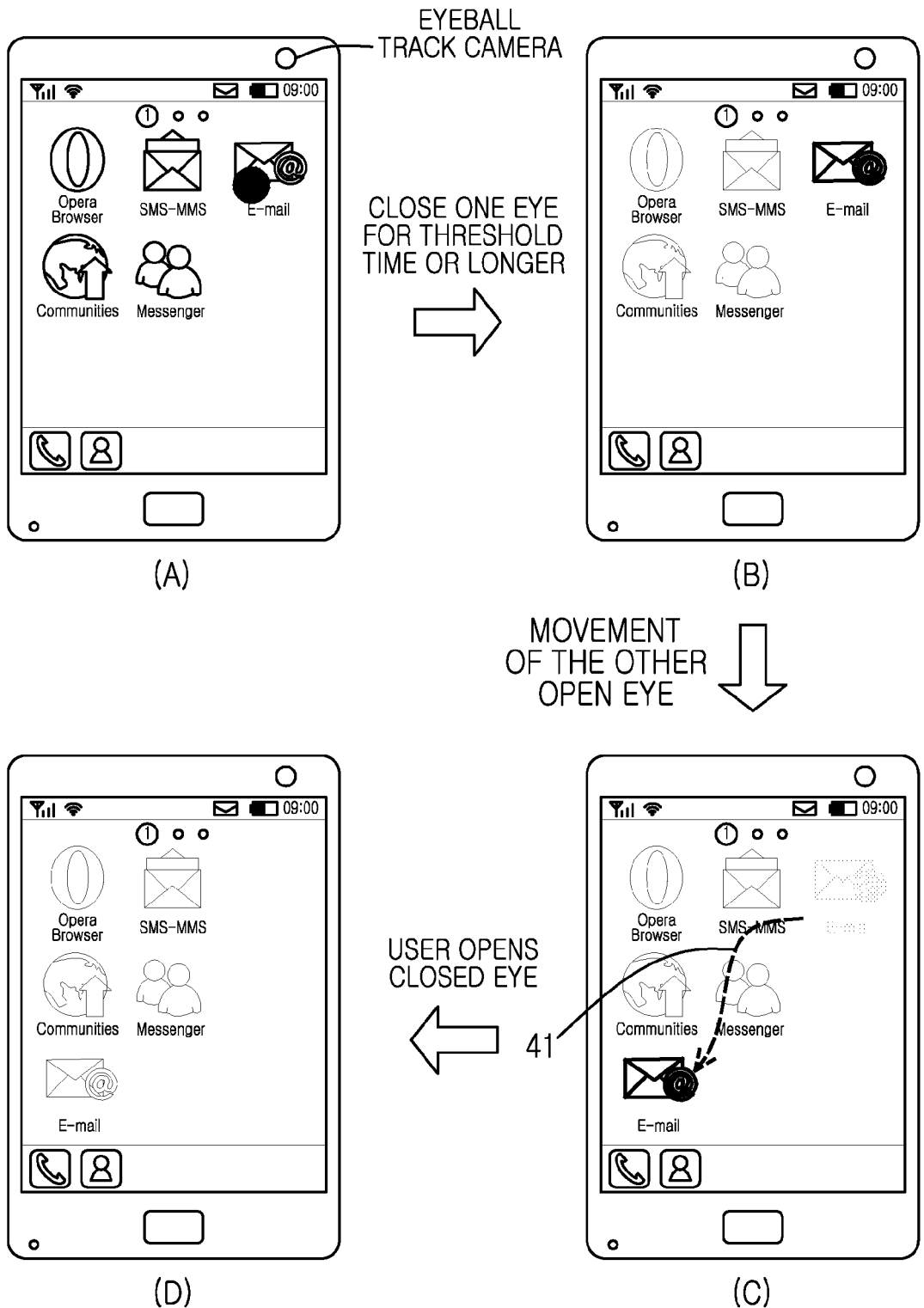
FIG. 4B is a view illustrating exemplary operation of a process for rearranging an icon on an icon menu screen according to an exemplary embodiment of the present invention.

FIG. 4B is a view illustrating an exemplary process for rearranging an icon on an icon menu screen according to an exemplary embodiment of the present invention.

Referring now to FIG. 4B, a position on the icon menu screen viewed by a user is displayed as a circular selection region (a). After that, when the user closes one eye for a threshold time or longer, the icon put on the selection region is displayed in relief and selected as an object to be rearranged (b). Next, when the user moves his eye with the other open eye (41), the icon to be rearranged is also moved and displayed by a corresponding amount (c). After that, when the user opens the closed eye, arrangement of the selected icon put on the moved position is completed (d). Of course, the mobile terminal could respond to a voice command such as "down" or "lower left", which may be preferable at time to further tracking eye movement.

Figure 5A:
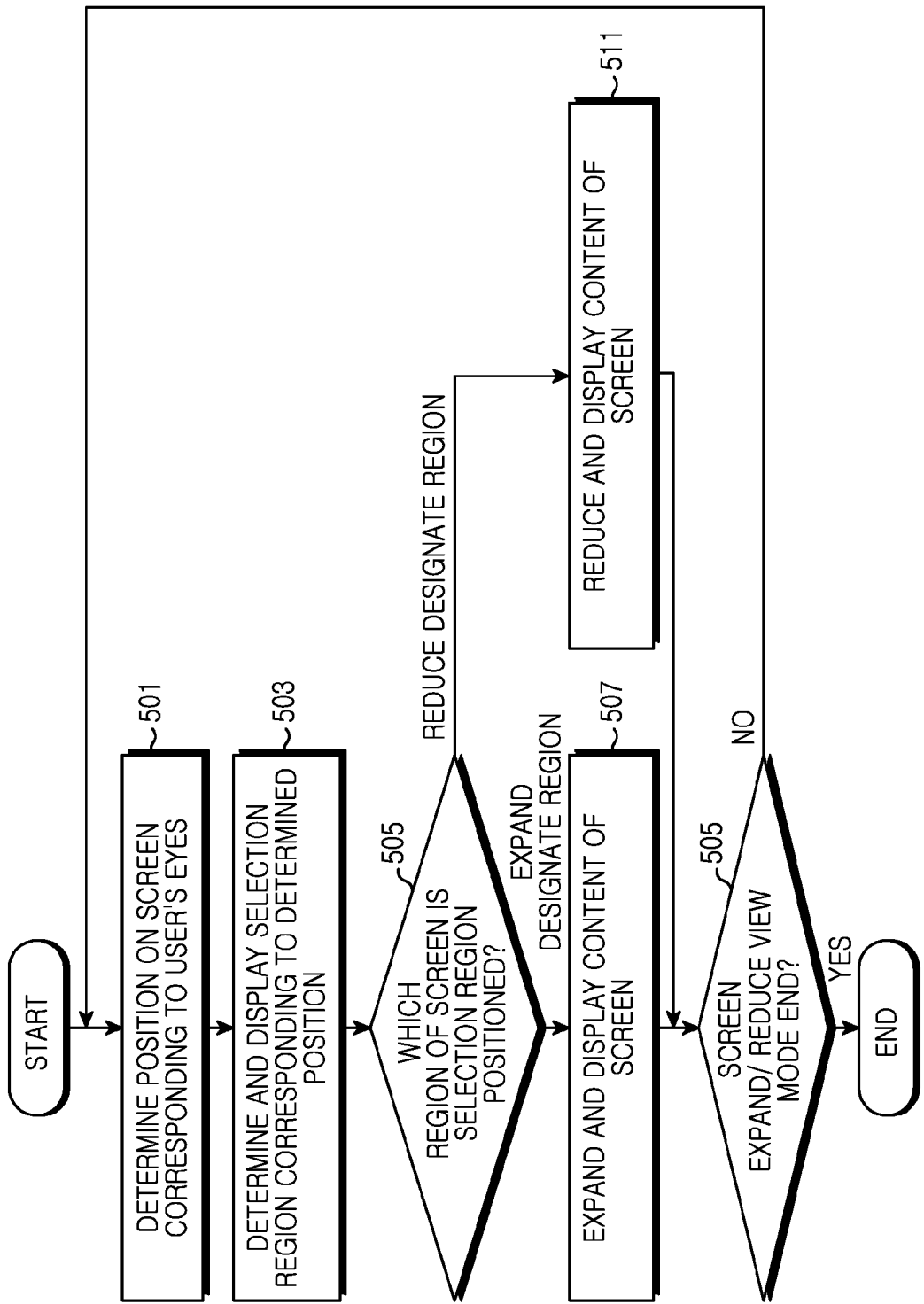
FIG. 5A is a flowchart illustrating exemplary operation of a procedure for expanding/reducing content of a screen and displaying the same according to an exemplary embodiment of the present invention.

FIG. 5A is a flowchart illustrating an example of a procedure for expanding/reducing content of a screen and displaying the same according to an exemplary embodiment of the present invention. The content of the screen may be an image such as a figure, a photo, etc., or a web page, an electronic book, etc. In a screen expand/reduce view mode, the controller 26 is accompanied by the following processes.

Referring now to FIG. 5A, the controller 26 determines a position on the screen corresponding to a user's eyes (step 501).

The controller 26 displays an indicator regarding the determined position on the screen (step 503). As described above, the indicator may be displayed as a circular selection region. The selection region is also moved according to the user's eyes.

Figure 5B:
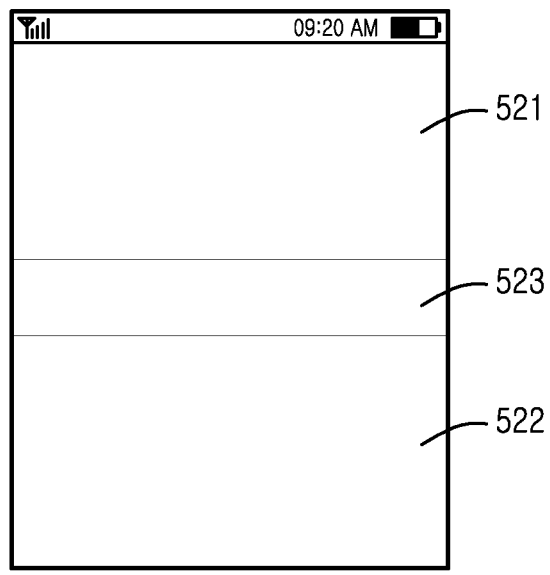
FIG. 5B is a screen of a screen expand/reduce view mode according to an exemplary embodiment of the present invention.

The controller 26 determines a region of the screen on which the selection region is positioned (step 505). FIG. 5B is a screen of a screen expand/reduce view mode according to an exemplary embodiment of the present invention. Referring now to FIG. 5B, the screen is divided into a region 521 designating expansion of the screen and a region 522 designating reduction of the screen. Furthermore, a region 523 that does not designate expansion and reduction may be further configured. The person of ordinary skill in the art understands and appreciates that the order of 521-523 could be changed, or the areas of the screen could be columns, etc.

When the selection region is positioned on the region designating expansion, the controller 26 expands and displays content of the screen (step 507). In contrast, when the selection region is positioned on the region designating reduction, the controller 26 reduces and displays content of the screen (step 511). Though not shown, when the selection region is positioned on the region 532 that does not designate expansion and reduction, the controller 26 does not expand or reduce the content of the screen.

The controller 26 performs processes subsequent to step 501 until the screen expand/reduce mode ends (step 509). When a generally configured end button is pressed, the mode may be ended.

Figure 6A:
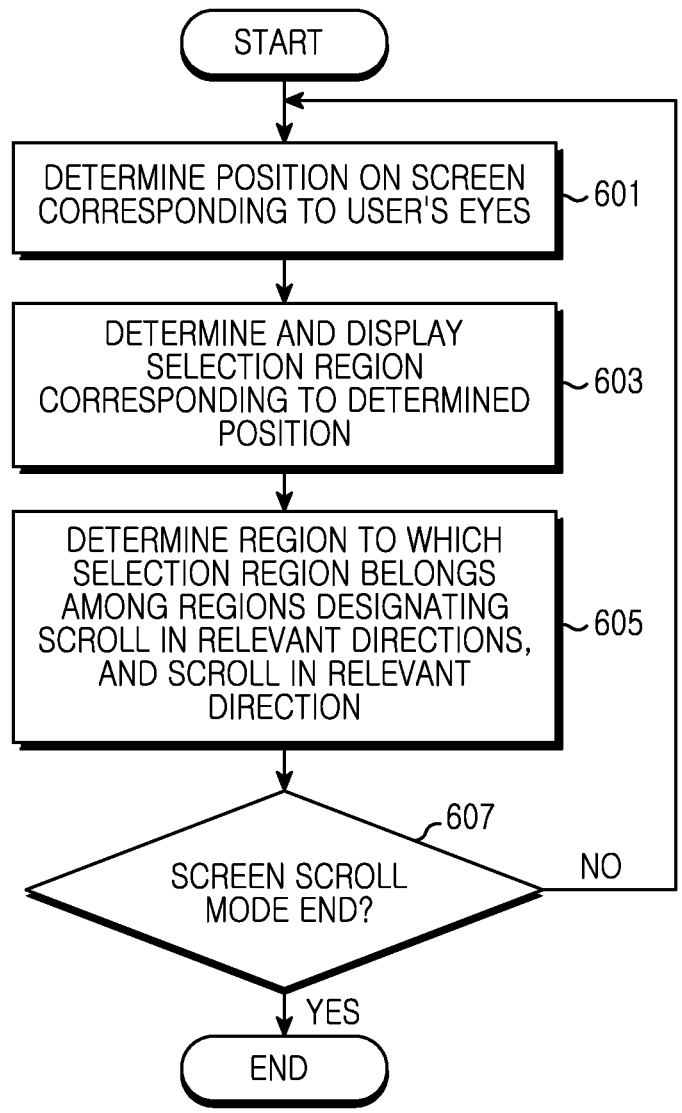
FIG. 6A is a flowchart illustrating exemplary operation of a procedure for scrolling contents of a screen according to an exemplary embodiment of the present invention.

FIG. 6A is a flowchart illustrating an exemplary procedure for scrolling contents of a screen according to an exemplary embodiment of the present invention. The content of the screen may be an image such as a figure, a photo, etc., or a web page, an electronic book, etc. In a screen scroll mode, the controller 26 is accompanied by the following processes.

Referring now to FIG. 6A, the controller 26 determines a position on the screen corresponding to a user's eyes (step 601).

The controller 26 displays an indicator for the determined position on the screen (step 603) that is being viewed. As described above, the indicator may be displayed as a circular selection region, or it could be a highlight, a flashing cursor, just to name a few non-limiting possibilities. The selection region is also updated and displayed according to a user's eyes. The selection region appears to move in a viewpoint of the user.

The controller 26 determines a region on which the selection region is positioned among regions designating scroll to a relevant direction, and scrolls a content in the relevant direction (step 605).

The controller 26 performs processes subsequent to step 601 until the screen scroll mode ends (step 607). When a generally configured end button is pressed, the mode may be ended.

Figure 6B:
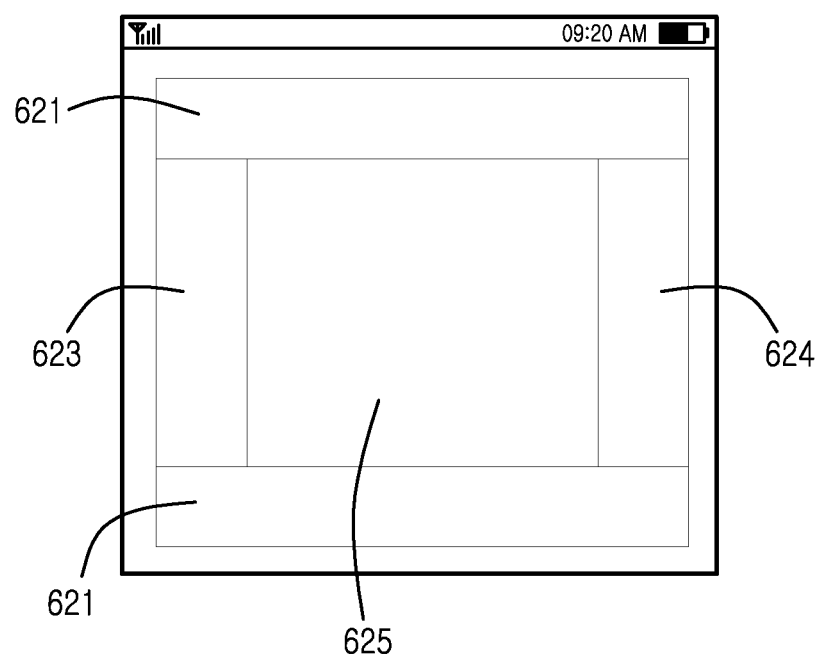
FIG. 6B is a screen illustrating exemplary operation of a scroll mode according to an exemplary embodiment of the present invention.

FIG. 6B is a screen illustrating a scroll mode according to an exemplary embodiment of the present invention.

Referring now to FIG. 6B, the screen is divided into a region 621 designating scroll to the top, a region 622 designating scroll to the bottom, a region 623 designating scroll to the left, and a region 624 designating scroll to the right. Furthermore, a region 625 that does not designate scroll may be further configured. For example, when the selection region is positioned on the region where the scroll to the bottom is designated, the controller 26 scrolls a content of the screen to the bottom and displays the same.

Figure 7:
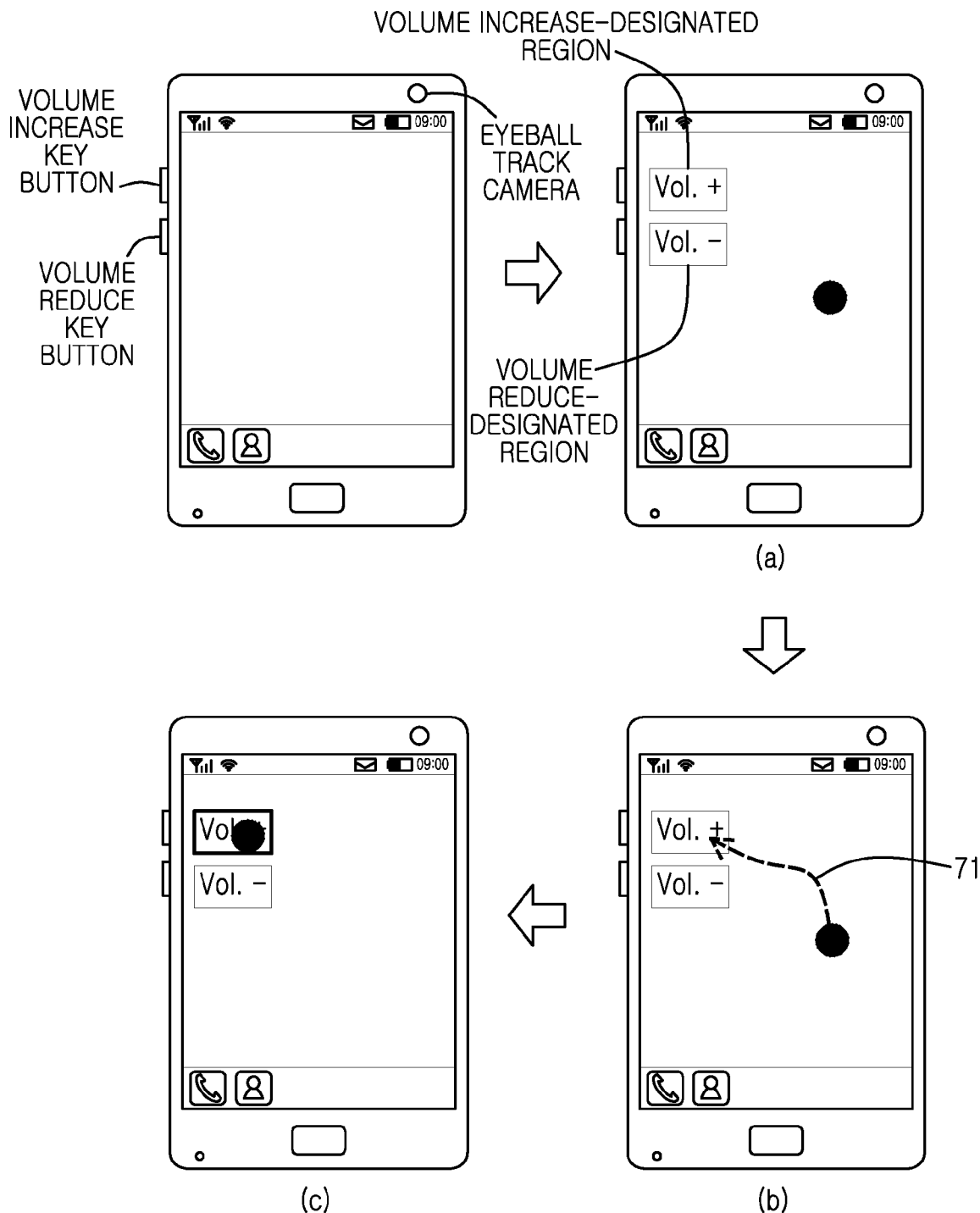
FIG. 7 is a view illustrating exemplary operation of a process for moving a button formed outside a screen onto the screen and selecting the same according to an exemplary embodiment of the present invention.

FIG. 7 is a view illustrating a process for moving a button formed outside a screen onto the screen and selecting the same according to an exemplary embodiment of the present invention. According to an exemplary embodiment of the present invention, the buttons formed outside of the screen is defined as a volume increase button and a volume reduce (i.e. decrease) button.

When a mode for involving the process of FIG. 7 is executed, respective buttons replacing the volume increase button and the volume reduce button formed outside the screen are displayed on the screen (a). In other words, a region where a volume increase has been designated and a region where a volume reduction has been designated are displayed. Furthermore, a position viewed by a user is displayed as a circular selection region on the screen. After that, when the user moves (71) his eyes, the selection region is updated and displayed (b). The selection region appears to move in a viewpoint of the user. When a user flickers his eyes with the updated selection region positioned on the region where the volume increase has been designated, for example, when the user flickers both his eyes or one of his eyes, the volume increase is performed (d).

Figure 8A:
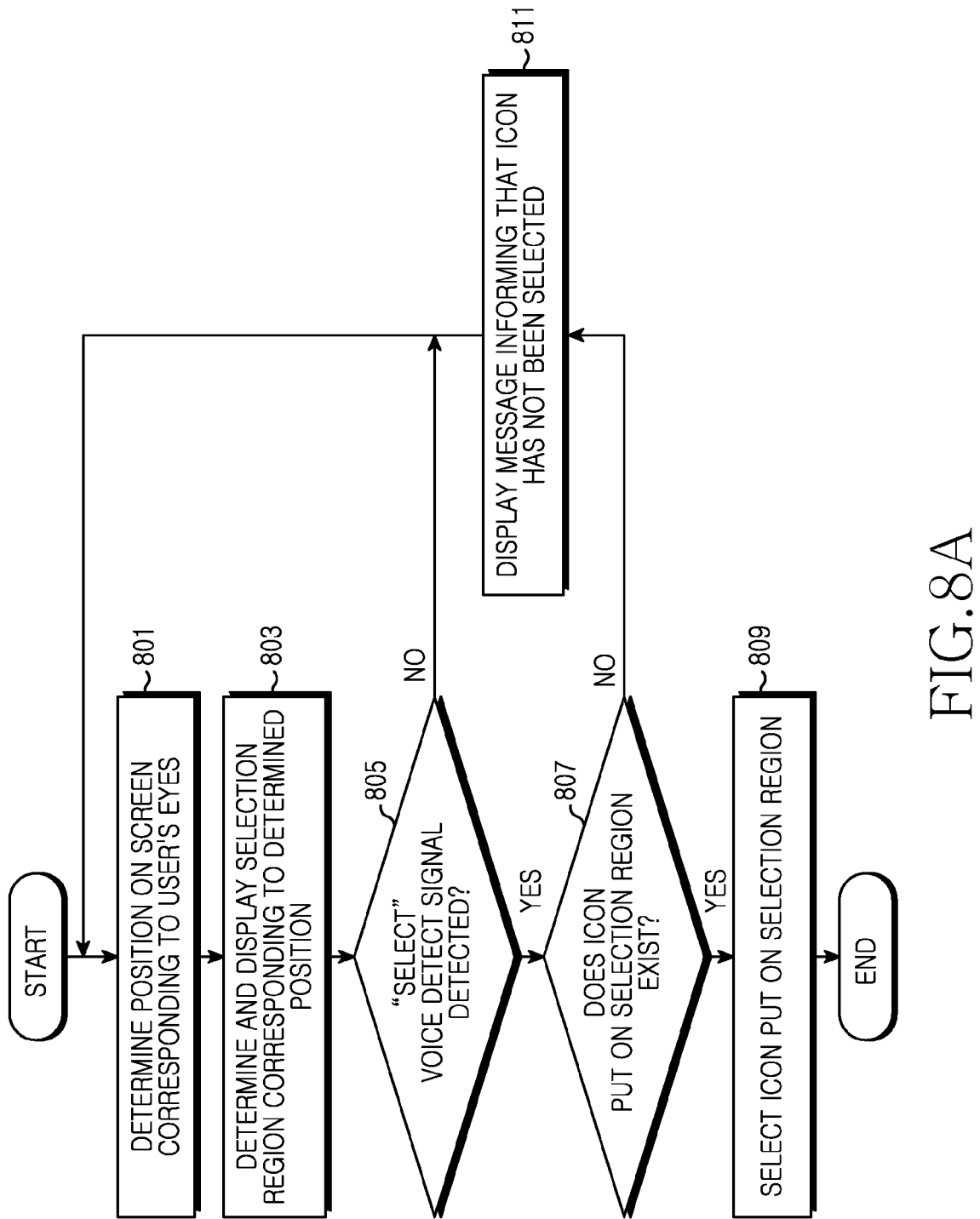
FIG. 8A is a flowchart illustrating exemplary operation of a procedure for selecting an icon on an icon menu screen according to an exemplary embodiment of the present invention.

FIG. 8A is a flowchart illustrating a procedure for selecting an icon on an icon menu screen according to an exemplary embodiment of the present invention. Though an icon is taken as an example of an object to be selected, the object to be selected is not limited thereto.

Referring now to FIG. 8A, the controller 26 determines a position on the screen corresponding to a position of the user's eyes on the icon menu screen (step 801).

The controller 26 displays an indicator for the determined viewing position of the user's eyes on the screen (step 803). In other words, the indicator is displayed at a position of the screen viewed by a user. As described above, the indicator may be displayed as a circular selection region.

The controller 26 determines whether a "select" voice detect signal is detected (step 805). When the "select" voice detect signal is not detected, the controller 26 performs processes subsequent to step 801.

In contrast, when the "select' voice detect signal is detected, the controller 26 determines whether an icon put on the selection region exists (step 807). When an icon put on the selection region exists in step 807, the controller 26 selects the icon put on the selection region (step 809). This selection is the same as the case where a user touches a relevant icon with his finger to select the same in a general touch screen terminal When the icon put on the selection region does not exist in step 807, the controller 26 displays a message informing that an icon has not been selected (step 811), and performs processes subsequent to step 801. The message may be displayed using characters or output using voice.

Figure 8B:
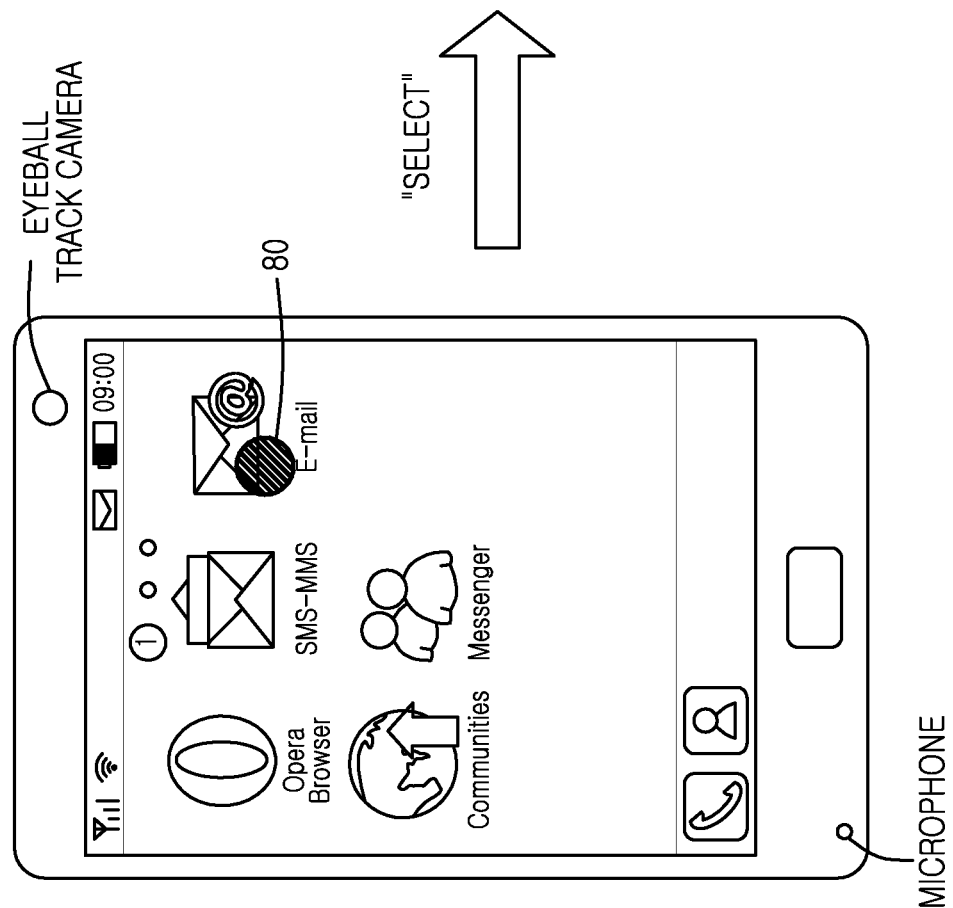
FIG. 8B is a view illustrating exemplary operation of a process for selecting an icon on an icon menu screen according to an exemplary embodiment of the present invention.

FIG. 8B is a view illustrating a process for selecting an icon on an icon menu screen according to an exemplary embodiment of the present invention.

Referring now to FIG. 8B, a position on the icon menu screen viewed by a user is displayed as a circular selection region 80. After that, when the user says "select", an icon put on the selection region is selected 90, and it can be seen that the other icons can be grayed or lightened when one particular icon is selected.

Figure 9A:
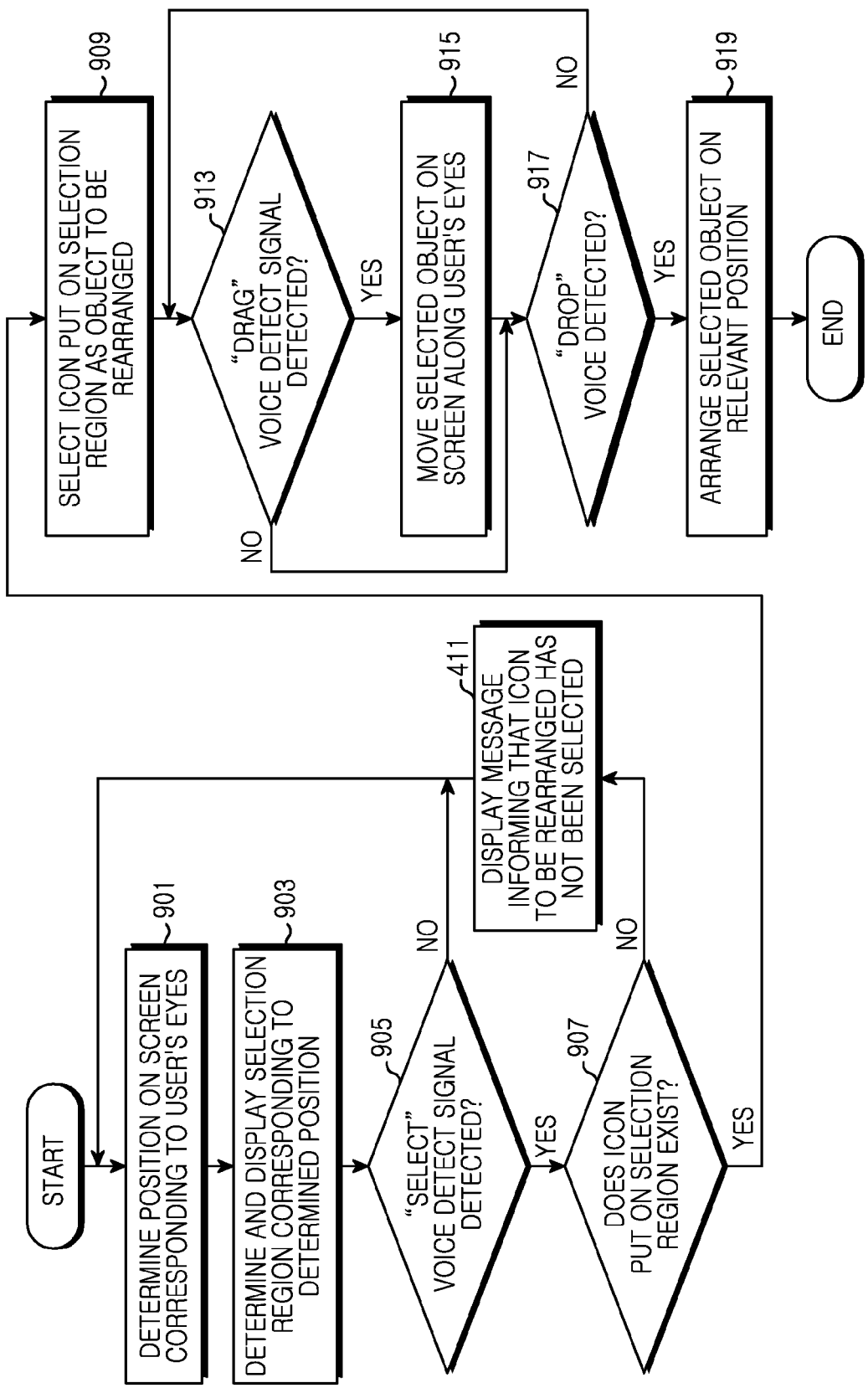
FIG. 9A is a flowchart illustrating exemplary operation of a process for rearranging an icon on an icon menu screen according to an exemplary embodiment of the present invention.

FIG. 9A is a flowchart illustrating a process for rearranging an icon on an icon menu screen according to an exemplary embodiment of the present invention. Though an icon is taken as an example of an object to be rearranged, the object of selection is not limited thereto.

Referring now to FIG. 9A, the controller 26 determines a position on the screen corresponding to a user's eyes on the icon menu screen (step 901).

The controller 26 displays an indicator for the determined viewing position on the screen (step 903). As described above, the indicator may be displayed as a circular selection region, or can be any of a plurality of possible visual indicators.

The controller 26 determines whether a "select" voice detect signal is detected (step 905). When the "select" voice detect signal is not detected, the controller 26 performs processes subsequent to step 901. In contrast, when the "select" voice detect signal is detected, the controller 26 determines whether an icon put on the selection region exists (step 907). When the icon put on the selection region exists in step 907, the controller 26 selects the icon put on the selection region as an object to be rearranged (step 909). The controller 26 may allow the selected icon for rearrangement to be displayed in relief compared to other icons. When the icon put on the selection region does not exist in step 907, the controller 26 displays a message informing that an icon for rearrangement has not been selected (step 911), and performs processes subsequent to step 901. The message may be displayed using characters or output using voice. This process permits inducing the selection region to be put on an icon that a user desires to rearrange.

The controller 26 determines whether a "drag" voice detect signal is detected (step 913). When the "drag" voice detect signal is not detected, the controller 26 performs processes subsequent to step 917. When the "drag" voice detect signal is detected, the controller 26 moves the selected object on the screen along detected movement of a user's eyes (step 915).

The controller 26 determines whether a "drop" voice detect signal is detected (step 917). When the "drop" voice detect signal is not detected, the controller 26 performs processes subsequent to step 913. When the "drop" voice detect signal is detected, the controller 26 arranges the selected icon to a position corresponding to the movement in step 915 on the screen (step 919).

Figure 9B:
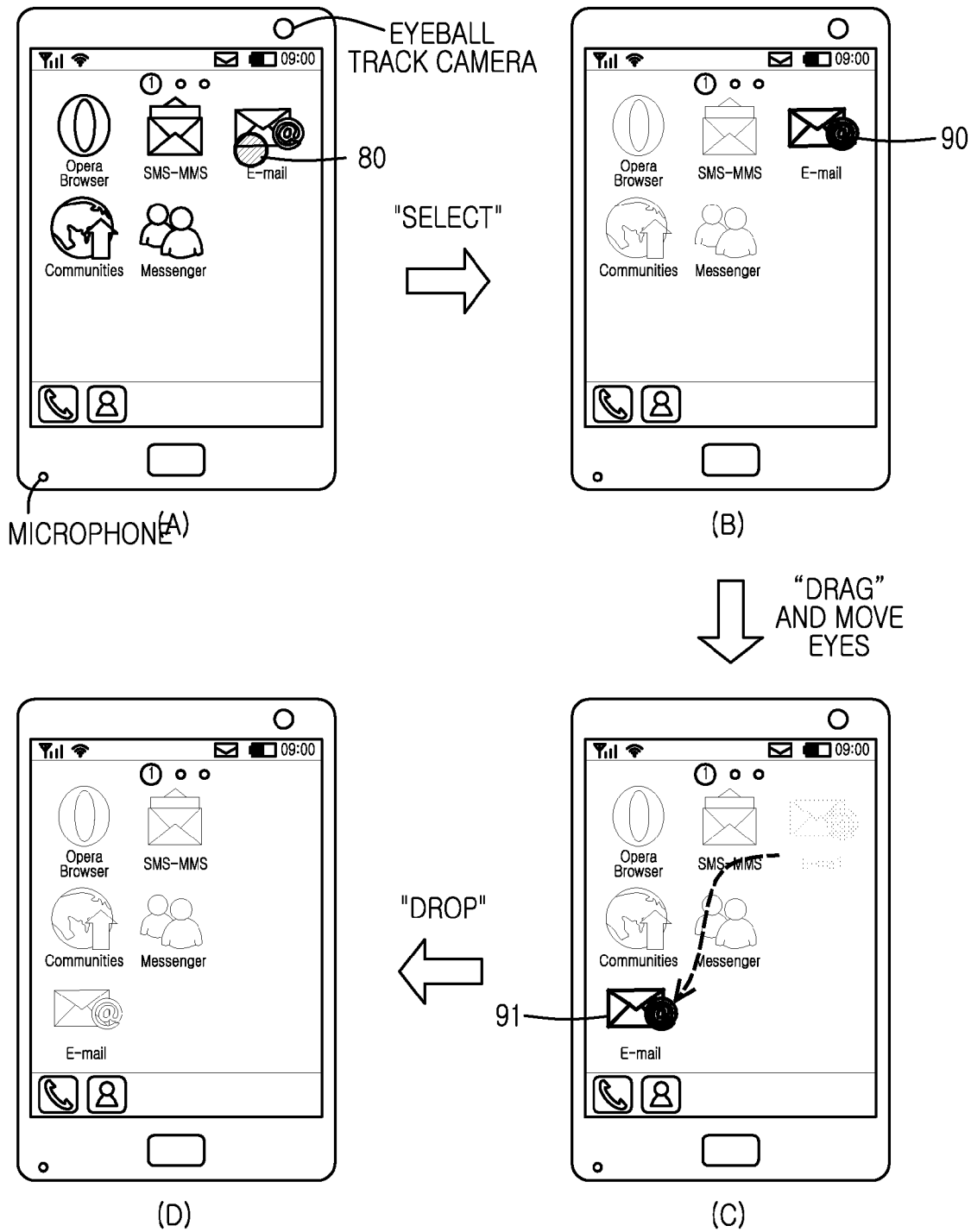
FIG. 9B is a view illustrating exemplary operation of a process for rearranging an icon on an icon menu screen according to an exemplary embodiment of the present invention.

FIG. 9B is a view illustrating a process for rearranging an icon on an icon menu screen according to an exemplary embodiment of the present invention.

Referring now to FIG. 9B, in the display (A), a position on the icon menu screen viewed by a user is displayed as a circular selection region 80. After that, when the user says "select", in (B) it is shown that an icon put on the selection region is displayed in relief and selected as an object 90 to be rearranged. Next, as shown in (C), when a user says "drag" and moves his eyes, the selected icon moves to the position 91 to which the user's eyes has been moved. After that, when the user says "drop", arrangement of the selection icon put on the moved position is completed (d).

As described with reference to FIGS. 8A to 9B, an exemplary embodiment of the present invention shows a construction where eyeball tracking and voice detection are combined.

In any event, according to the present invention, where by eyeball tracking, voice, or a combination of the two, selection of items can occur and result in activation of screens, operations, and views just as if the mobile terminal had received a sensed touch of keyboard command. Furthermore, the mode for selecting an icon, the mode for rearranging an icon, the mode for expanding/reducing the screen, the mode for scrolling content of the screen, etc. may be executed by selecting a relevant button on the screen using the method described with reference to FIG. 3A. Moreover, these modes may be executed when a general key button is pressed. Furthermore, these modes may be executed via voice detection. For example, when a user says "scroll mode", a scroll mode is executed, and regions where scrolls to respective directions have been designated are displayed.

In addition, respective modes may be switched to eye flickering. For example, when a user flickers his eyes twice while the expansion/reduction mode of FIG. 5B is executed, a mode may be switched to a scroll mode. In other words, switching between the respective modes may be designated depending on the kind of eye flickering.

Consequently, the present invention promotes a user's convenience by generating an input for a relevant function without using the user's hands.

The above-described methods according to the present invention can be implemented in hardware or as software or computer code that can be stored in a recording medium such as a CD ROM, an RAM, a floppy disk, a hard disk, or a magneto-optical disk or downloaded over a network and stored on a non-transitory machine readable medium, so that the methods described herein can be rendered in such software using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Voice recognition software that is commercially available can be used for the recognizing of voice commands, and the artisan appreciates and understands that the claimed invention can use other voice commands than the exemplary one provided herein.

In addition, visual tracking software can be used/modified to practice the present invention, which is not limited to mobile terminals and preferably includes any type of apparatus with a visual display screen. For example automatic teller machines, MP3 players, virtually any device where one uses a mouse or touch screen to enter data.

It should be understood that the present invention is applicable to virtually any type of device in addition to a mobile terminal, regardless of their wireless transmission capability. Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for use in an electronic device, the method comprising:
   providing, by the electronic device, an indicator at a position on a display screen at which a user is looking by tracking an eye of the user while displaying an object on the display screen;
   in response to a first voice command, determining, by the electronic device, whether the indicator is arranged on the object;
   moving, by the electronic device, the object to the position on the display screen at which the user is looking by tracking the eye of the user; and
   in response to a second voice command, completing, by the electronic device, a movement of the object at the position on the display screen at which the user is looking.

2. The method of claim 1, wherein the object is selected for moving in response to detecting an eye blink if the indicator is arranged on the object.

3. An electronic device comprising:
   a tracking unit configured to track an eye of a user;
   a display screen configured to display an object and an indicator at a position on the display screen at which the user is looking by tracking the eye of the user via the tracking unit;
   a voice detector configured to detect voice commands; and
   a controller configured to:
      in response to a first voice command identified by the voice detector, determine whether the indicator is arranged on the object;
      move the object to the position on the display screen at which the user is looking by tracking the eye of the user via the tracking unit; and
      in response to a second voice command identified by the voice detector, complete a movement of the object at the position on the display screen at which the user is looking.

4. The electronic device of claim 3, wherein the object is selected for moving in response to an eye blink detected by the tracking unit if the indicator is arranged on the object.

5. An electronic device comprising a processor configured to:
   operate the electronic device in a plurality of modes, wherein if the electronic device is in any one of the plurality of modes, the processor performs a different operation based on an eye moving from a first location to a second location; and
   transition the electronic device into any one of the plurality of modes if a respective eye blink is detected that is associated with that mode,
   wherein each of the plurality of modes is associated with a different respective eye blink, and the plurality of modes includes a first mode and a second mode,
   wherein if the electronic device is in the first mode, the processor performs a first operation based on the eye moving from the first location to the second location, and when the electronic device is in the second mode, the processor performs a second operation based on the eye moving from the first location to the second location.

6. The electronic device of claim 5, wherein performing the first operation includes scrolling of content.

7. The electronic device of claim 5, wherein performing the first operation includes zooming of content.

8. The electronic device of claim 5, wherein performing the first operation includes dragging-and-dropping of content.

9. An electronic device for performing a drag-and-drop operation, comprising a display screen and a controller configured to perform operations of:
   displaying an indicator at a position on the display screen at which a user is looking by tracking an eye of the user;
   in response to a first eye closing for a threshold time or longer, selecting an object arranged on the display by placing the indicator on the object;
   in response to an eyeball of a second eye moving while the second eye is open and the first eye is closed, moving the object along with movements of the second eye; and
   in response to the first eye opening, stopping to move the object along with the movements of the second eye, so that the object becomes dropped at a current location of the object.

10. A method comprising:
    if an electronic device is in a first mode, performing a first operation based on an eye moving from a first location to a second location; and
    if the electronic device is in a second mode, performing a second operation based on the eye moving from the first location to the second location
    wherein the electronic device is configured to operate in a plurality of modes including the first mode and the second mode, wherein if the electronic device is in any one of the plurality of modes, the electronic device performs a different respective operation based on the eye moving from the first location to the second location,
    wherein the electronic device is configured to transition into any one of the plurality of modes if a respective eye blink is detected that is associated with that mode, and
    wherein each of the plurality of modes is associated with a different respective eye blink.

11. The method of claim 10, wherein performing the first operation includes scrolling of content.

12. The method of claim 10, wherein performing the first operation includes zooming of content.

13. The method of claim 10, wherein performing the first operation includes dragging-and-dropping of content.

14. A method for performing a drag-and-drop operation in an electronic device, the method comprising:
    displaying an indicator at a position on a display screen of the electronic device at which a user is looking by tracking an eye of the user;
    in response to a first eye closing for a threshold time or longer, selecting an object arranged on the display by placing the indicator on the object;
    in response to an eyeball of a second eye moving while the second eye is open and the first eye is closed, moving the object along with movements of the second eye; and
    in response to the first eye opening, stopping to move the object along with the movements of the second eye, so that the object becomes dropped at a current location of the object.

15. An electronic device comprising a display screen and a processor, the display screen having a left edge, a right edge, a top edge, and a bottom edge, and the processor being configured to:
    display content on the display screen;
    designate: (1) a first region at the left edge of the display screen as a scroll-left region, (2) a second region at the right edge of the display screen as a scroll-right region, (3) a third region at the top edge of the display screen as a scroll-up region, and (4) a fourth region at the bottom edge of the display screen as a scroll-down region, wherein each of the regions spans at least half of the length of that region's respective edge;

identify a location on the display screen at which a user is currently looking by tracking an eye of the user;

in response to the location being situated in the first region, scroll the content to the left;

in response to the location being situated in the second region, scroll the content to the right;

in response to the location being situated in the third region, scroll the content up; and in response to the location being situated in the fourth region, scroll the content down.

\* \* \* \* \*